United States Patent
Yamada et al.

(10) Patent No.: US 6,930,699 B2
(45) Date of Patent: Aug. 16, 2005

(54) OPTICAL PRINTING DEVICE

(75) Inventors: Keiki Yamada, Tokyo (JP); Ichiro Furuki, Tokyo (JP); Hiroshi Ito, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1001 days.

(21) Appl. No.: 09/841,049

(22) Filed: Apr. 25, 2001

(65) Prior Publication Data

US 2002/0054203 A1 May 9, 2002

(51) Int. Cl.$^7$ .................................................. B41J 2/47
(52) U.S. Cl. ........................................................ 347/232
(58) Field of Search .................................. 347/232, 237, 347/246, 247, 252, 254

(56) References Cited

FOREIGN PATENT DOCUMENTS

JP          A7256928          10/1995

*Primary Examiner*—K. Feggins
(74) *Attorney, Agent, or Firm*—Birch, Stewart, Kolasch & Birch, LLP

(57) ABSTRACT

An optical printing device for exposing a photosensitive recording medium to form a grayscale image includes a print head having n rows of recording elements capable of exposure of different colors and aligned in a direction of advancement of the photosensitive recording medium, where n is an integer more than 1, the n rows of recording elements being spaced substantially a multiple of L×(m+k/n) apart in the direction of advancement of the photosensitive recording medium, where L denotes a distance between the centers of recording pixels according to the desired resolution of a recorded image, m is an integer of 1 or more, and k is an integer of 1 or more and less than n. The optical printing device also includes a head driver for driving the print head. Light from the print head is selectively exposed on the photosensitive recording medium to form the grayscale image.

9 Claims, 16 Drawing Sheets

OPTICAL PRINTING DEVICE

BACKGROUND OF THE INVENTION

1. Field of the Invention

The present invention generally relates to optical printing devices for exposing photosensitive recording media to form grayscale images. More particularly, the present invention relates to an optical printing device for selectively exposing a photosensitive recording medium based on image data, the optical printing device having a plurality of rows of multiple recording elements, including light-emitting elements such as light emitting diodes (LEDs) or electroluminescent (EL) elements, and switching elements such as liquid crystal shutter elements.

2. Description of the Related Art

A great number of devices for exposing photosensitive recording media to form grayscale images have been developed as devices that use instant films or colored paper, and are commercially available. FIG. 16 is a perspective view schematically showing a conventional optical print head mechanism disclosed in, for example, Japanese Unexamined Patent Application Publication No. 7-256928. In FIG. 16, white light emitted from a point-source halogen lamp 100 is separated into red, green, and blue light components by using a color liquid crystal shutter 101, which are then successively incident onto an end face of an acrylic rod 102 with a time lag. The acrylic rod 102 includes a reflective aluminum film deposited on the entire surface thereof except for a portion from which light emerges, and serves to convert the light entering from the end face into a line of light. Accordingly, linear red, green, and blue light is successively incident onto a black-and-white shutter array 103 with a time lag.

The black-and-white shutter array 103 includes three rows of pixels corresponding to red, green, and blue, respectively, through which only the light of a specified color may be transmitted. For example, when linear red light is emitted, the light is transmitted only through the row of red pixels, but is blocked by the other two rows of pixels. The linear red, green, and blue light converted by the black-and-white shutter array 103 is focused onto a photosensitive paper sheet 105 such as spectra-instant film manufactured by Polaroid Corporation by a SELFOC lens array 104 (SELFOC is a brand of condenser lens arrays). As the photosensitive paper sheet 105 is advanced relative to the black-and-white liquid crystal shutter array 103, the linear red, green, and blue light is sequentially incident onto the same location on the photosensitive paper sheet 105, thus forming a two-dimensional print image.

Conventionally, the photosensitive recording medium is exposed in this way and a grayscale image is thus formed. The two liquid crystal shutters, namely, the color liquid crystal shutter 101 and the black-and-white shutter array 103, are typically implemented by an STN (supertwisted nematic) liquid crystal, a ferroelectric liquid crystal, or the like capable of high-speed response in milliseconds by applying an AC voltage of approximately 10 kHz in order to achieve a short print time.

A large number of liquid crystal shutters are commercially available also as display devices. A device using a liquid crystal shutter includes two glass substrates, between which liquid crystal is inserted, and a spacer for preventing the upper and lower glass substrates from contacting each other. Typically, polarizers are disposed above the upper glass substrate and below the lower glass substrate so that their transmission axes are perpendicular to each other. The liquid crystal has a characteristic that an applied voltage (electric field) changes the orientation of molecules to become aligned along the electric field. For example, light is transmitted or otherwise reflected when a voltage is applied, and light is blocked when no voltage is applied. Furthermore, the intensity of the applied voltage is utilized for grayscale representation.

Driving methods of liquid crystals include a passive-matrix driving method and an active-matrix driving method. In the passive-matrix driving method, a stripe-like transparent electrode extending in the horizontal direction is formed on an upper glass substrate, and a stripe-like transparent electrode extending in the vertical direction is formed on a lower glass substrate, such that a voltage is applied to selective intersection points of the vertical and horizontal transparent electrodes to thereby control the transmission of light. In the active-matrix driving method, transistors are disposed at intersections of the vertical and horizontal electrodes to accumulate electric current at portions that form pixels.

In general, there are transmission- and reflection-mode liquid crystal displays. The transmission-mode liquid crystal display is of the type in which light from a backlight below the liquid crystal is transmitted through the liquid crystal to display an image. The reflection-mode liquid crystal display is of the type in which light is reflected by a reflector at the bottom below the liquid crystal to display an image.

The foregoing typical optical printing device has drawbacks in that high-speed and high-quality recording is not achieved at low cost. Such an optical printing device is designed so that rows of recording elements perform sequential exposures, causing color misalignment associated with time-lag exposures, resulting in degradation in image quality. Furthermore, data transfer to the print head is unsophisticated, leading to a low recording rate.

SUMMARY OF THE INVENTION

Accordingly, the present invention has been made in order to overcome the foregoing drawbacks, and it is an object of the present invention to provide an optical printing device capable of high-speed and high-quality recording at low cost.

To this end, in an aspect of the present invention, an optical printing device for exposing a photosensitive recording medium to form a grayscale image includes a print head having n rows of recording elements capable of exposure of different colors and aligned in a direction of advancement of the photosensitive recording medium, where n is an integer more than 1, the n rows of recording elements being spaced substantially a multiple of $L \times (m+k/n)$ apart in the direction of advancement of the photosensitive recording medium, where L denotes a distance between the centers of recording pixels according to the desired resolution of a recorded image, m is an integer of 1 or more, and k is an integer of 1 or more and less than n. The optical printing device also includes a head driver for driving the print head. Light from the print head is selectively exposed on the photosensitive recording medium to form the grayscale image. Therefore, an optical printing device capable of high-speed and high-quality recording at low cost is attained.

The recording elements in the n rows of recording elements capable of exposure of different colors may be staggered. Therefore, high-quality recording is achieved without black or white stripes.

In another aspect of the present invention, an optical printing device for exposing a photosensitive recording medium to form a grayscale image includes a print head having n rows of recording elements capable of exposure of different colors and aligned in a direction of advancement of the photosensitive recording medium, where n is an integer more than 1, and a head driver for driving the print head to successively perform the exposures of the n rows of recording elements so as to provide n+1 colors after the exposure in one line, wherein light from the print head is selectively exposed on the photosensitive recording medium to form the grayscale image. Therefore, an optical printing device capable of high-speed and high-quality recording at low cost is attained.

The print head may include at least one driver IC, the driver IC outputting individual electrode and common electrode signals for driving the recording elements in the n rows of recording elements. Therefore, high-quality recording is achieved at low cost.

The print head may include a counter for counting one of a counter clock signal and a latch signal, the counter clock signal and the latch signal being output from the head driver, and a head data comparator for comparing the output of the counter with latched head data. Therefore, only a single data transfer to the print head per line is required, thus reducing the number of data transfers, resulting in high-speed recording.

The print head may further include a single individual electrode for driving the recording elements in the n rows of recording elements, the individual electrode being shared by a plurality of the recording elements. Therefore, a reduced number of individual electrodes is required, so that the optical printing device may be less expensive.

Each of different head data signals output from the head driver may be supplied to the driver IC on the print head. Therefore, high-quality and high-speed recording is achieved.

The print head may have a positive twisted nematic liquid crystal. Therefore, the optical printing device has a superior contrast ratio.

The print head may have an electroluminescent exposing unit. Therefore, the optical printing device may be compact and have increased light intensity.

BRIEF DESCRIPTION OF THE DRAWINGS

The present invention will be described in the following detailed description with reference to the drawings in which.

DESCRIPTION OF THE PREFERRED EMBODIMENTS

First Embodiment

Figure 1:
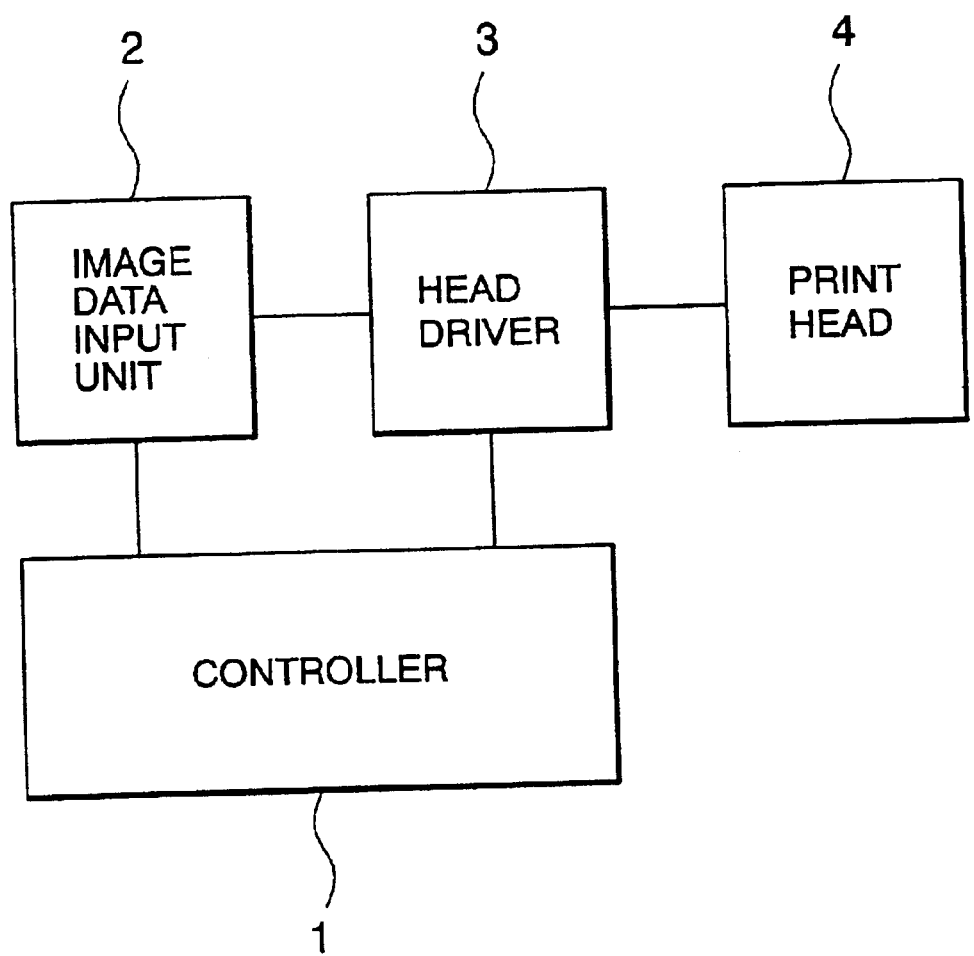
FIG. 1 is a block diagram of an optical printing device according to a first embodiment of the present invention.

FIG. 1 is a block diagram of an optical printing device according to a first embodiment of the present invention. The optical printing device includes a controller 1, an image data input unit 2 for inputting image data, a head driver 3, and a print head 4.

The controller 1 controls the components in the optical printing device, and includes a microprocessor, a circuit, and, if necessary, a memory. The image data input unit 2 is used to input image data from an external host computer or mobile terminal unit (not shown) as grayscale data. The grayscale data includes 256-level data for which values of "0" to "255" are input, and 64-level data for which values of "0" to "63" are input, and therefore values of "0" to "n−1" for n-level data are input, where n is an integer more than 1. Physical interfaces of the image data input unit 2 include an existing parallel interface such as a Centronics interface, a serial interface such as RS232C, a hard-wired interface such as IEEE1394 or USB (Universal Serial Bus), and a wireless interface complying with an infrared communication protocol or Bluetooth. Various commands for the number of pixels etc. are exchanged between an external host computer (not shown) and the optical printing device by the controller 1 by a desired procedure.

The head driver 3 outputs image data output from the image data input unit 2 as head-driving data. For example, when the print head 4 is a print head for binary data, only binary data indicating recording and non-recording is input to the print head 4. Thus, the binary data is transferred to the print head 4 for each grayscale level, and an exposure is performed for a desired time each time the data is transferred. When the print head 4 is a print head for multilevel data, however, the output data from the image data input unit 2 is transferred to the print head 4, or, if necessary, the data obtained by image processing the output data is transferred to the print head 4. In either case, the head driver 3 interfaces with the print head 4 such that the head driver 3 controls clock signals, latch signals, and the like in time with the print head 4. The print head 4 is driven so that the gradation characteristic may be linear, with exposure on each grayscale level for a desired time, such as an exposure time of 1 μs to 300 μs.

Figure 2:
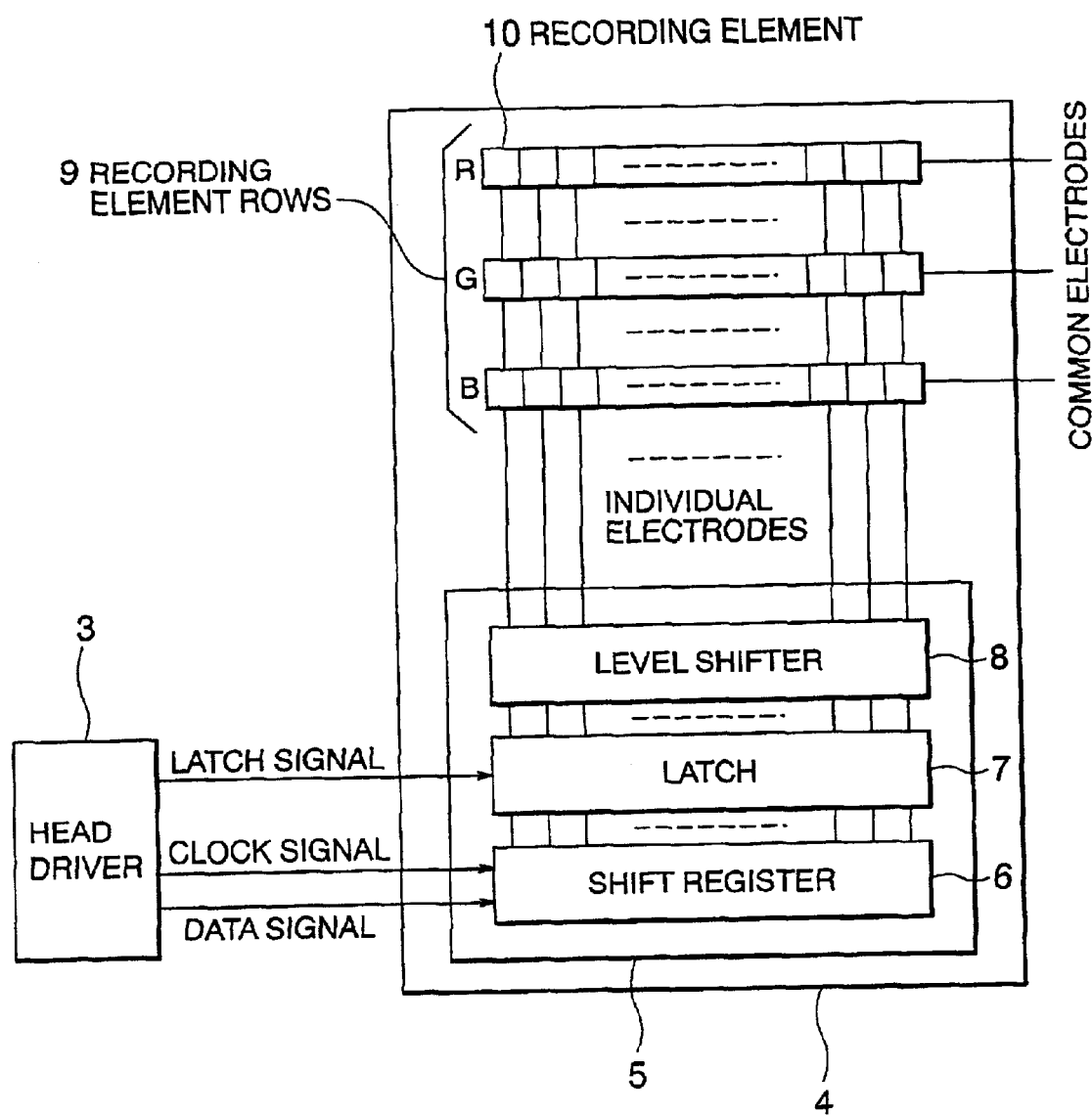
FIG. 2 is a schematic view showing a print head for binary data in detail.

FIG. 2 illustrates the print head 4 for binary data in detail. The print head 4 includes a driver IC 5 having a shift register 6, a latch 7, and a level shifter 8. The outputs of the level shifter 8 are connected to recording elements 10 as individual electrodes, and R, G, and B recording element rows 9 each having a plurality of recording elements 10 in a row are individually connected to common electrodes. Thus, common electrode signals output from the head driver 3 are passed to the common electrodes of the recording element rows 9.

The shift register 6 sequentially shifts data for the head according to the clock signal from the head driver 3, and the resulting data is then latched into the latch 7 according to the latch signal. The latched data is converted to a desired voltage by the level shifter 8 to selectively drive the recording elements 10 in the print head 4.

A specific description is made of how the print head 4 is driven. Initially, the head driver 3 outputs a clock signal for the print head 4, and outputs image data as a binary data signal. For example, if a sequence of data "0", "128", "252", . . . , and "1" is output from the image data input unit 2, then data signals of "0", "1", "1", . . . , and "1", which are values compared with a first grayscale level of "1", are output as first grayscale level data. After the first grayscale level data is output, the head driver 3 outputs a latch signal, and removes the voltage applied to recording elements 10, followed by exposure for the first grayscale level data. The same operation is repeatedly performed for the second to 255th grayscale level data in one line to thereby complete the exposure, and the same operation is repeatedly performed in one picture plane to form an image.

Figure 3:
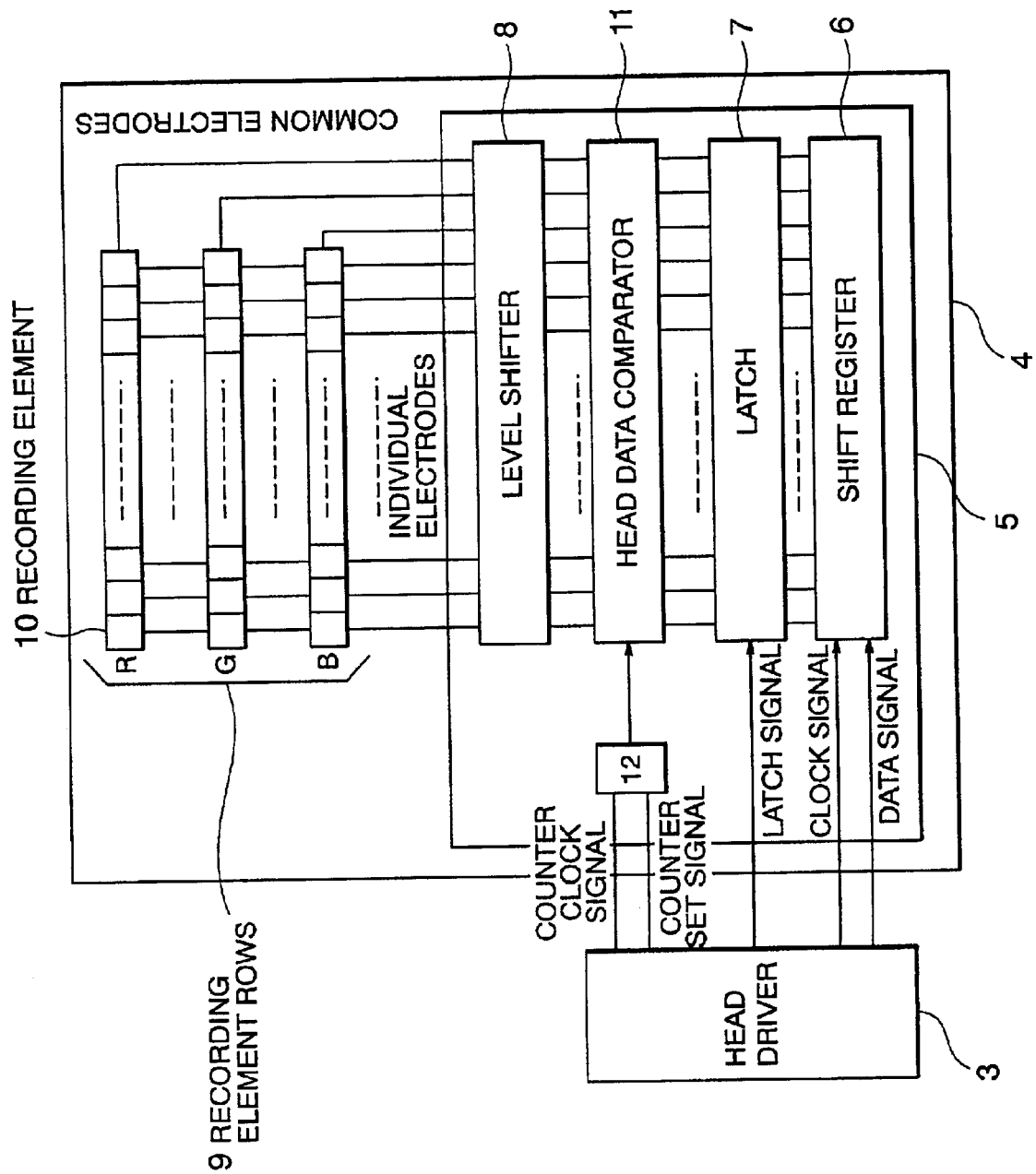
FIG. 3 is a schematic view showing a print head for multilevel data in detail.

FIG. 3 illustrates the print head 4 for multilevel data in detail, and the print head 4 further includes a head data comparator 11, and a counter 12 in addition to the components of the print head 4 shown in FIG. 2. A specific description is made of how the print head 4 is driven. Initially, the head driver 3 outputs a head data signal corresponding to the image data to the shift register 6 in synchronization with a clock signal. The shift register 6 is a shift register for multilevel data, not for binary data.

Then, based on a command from the head driver 3 that data corresponding to one line of the image data has been transferred, a latch signal is input. In response to a counter set signal from the head driver 3, the counter 12 is set at a predetermined value, e.g., 0, and the head driver 3 sequentially supplies counter clock signals to increment the counter 12. The head data comparator 11 compares the output of the counter 12 with that of the latch 7 to continuously output, for example, the signals "1" when the output of the counter 12 is lower than the output of the latch 7; however, when the counter 12 reaches a value equal to or more than the output of the latch 7, the head data comparator 11 continuously outputs the signals "0". The counter clock signal may be combined with the latch signal, in which case the counter clock signal may be removed.

The output data is then converted to a desired voltage by the level shifter 8 to selectively drive the recording elements 10 in the print head 4 for recording a first line. The same operation is repeated for the following lines, forming an image of one picture plane. The print head 4 for multilevel data only requires a single data transfer to the print head 4 per line, and the number of data transfers is reduced, resulting in high-speed recording.

The print head 4 includes, for example, 640 liquid crystal shutter elements used as the recording elements 10, and the liquid crystal shutter elements are selectively driven to thereby control the time for light to be transmitted therethrough, resulting in image formation. An exemplary liquid crystal shutter element is formed by injecting twisted nematic (TN) liquid crystal between two glass substrates which are held between two polarizers whose absorption axes are displaced by 90° to each other. With this arrangement, the liquid crystal shutter element is transparent when no voltage is applied, and is in a blocking state when a voltage is applied, such that a time period during which no voltage is applied is controlled to control the exposure time. This results in image formation with gradation. This type of shutter element is called a positive liquid crystal shutter element.

On the other hand, a negative liquid crystal shutter element includes two polarizers whose absorption axes are in parallel. Thus, the shutter element is transparent when a voltage is applied, and is in a blocking state when no voltage is applied, such that a time period during which a voltage is applied is controlled to provide grayscale image formation. The negative type has a relatively higher transmissivity while light is blocked than the positive type, and an image having poor contrast and gradation is obtained. Thus, the positive type is preferable for the print head 4.

Liquid crystal types include nematic liquid crystal such as TN or STN liquid crystal, cholesteric liquid crystal, and smectic liquid crystal such as ferroelectric liquid crystal. Desirably, the print head 4 incorporated in an exposure device should have a high contrast ratio, high response rate of the liquid crystal elements, low driving voltage, superior shock-resistance characteristics, etc. Some experimental results reveal that the TN liquid crystal would be more preferable. Specifically, the TN liquid crystal has a contrast ratio more than 10 times higher than the STN liquid crystal, and has a better shock-resistance characteristics than the smectic liquid crystal.

Prior to the operation, an exposure method according to the first embodiment is described with reference to FIGS. 4 to 6.

Typically, the print head 4 having n recording element rows 9 capable of exposure of different colors, where n is an integer more than 1, includes different driver ICs 5 for the recording element rows 9 to independently drive recording elements 10. On the other hand, as shown in FIGS. 2 and 3, a common driver IC 5 which uses a single individual electrode to drive a plurality of the recording elements 10 would provide a less expensive configuration. However, the relative movement between the print head 4 and a photosensitive recording medium for image formation causes color misalignment. This is because, for example, when three recording element rows 9 corresponding to R, G, and B colors are employed, the R, G, and B recording element rows 9 should not perform exposures simultaneously, but should sequentially perform exposures, such as in the order of the R, G, and B recording element rows 9, during the relative movement between the print head 4 and the photosensitive recording medium.

Figure 4:
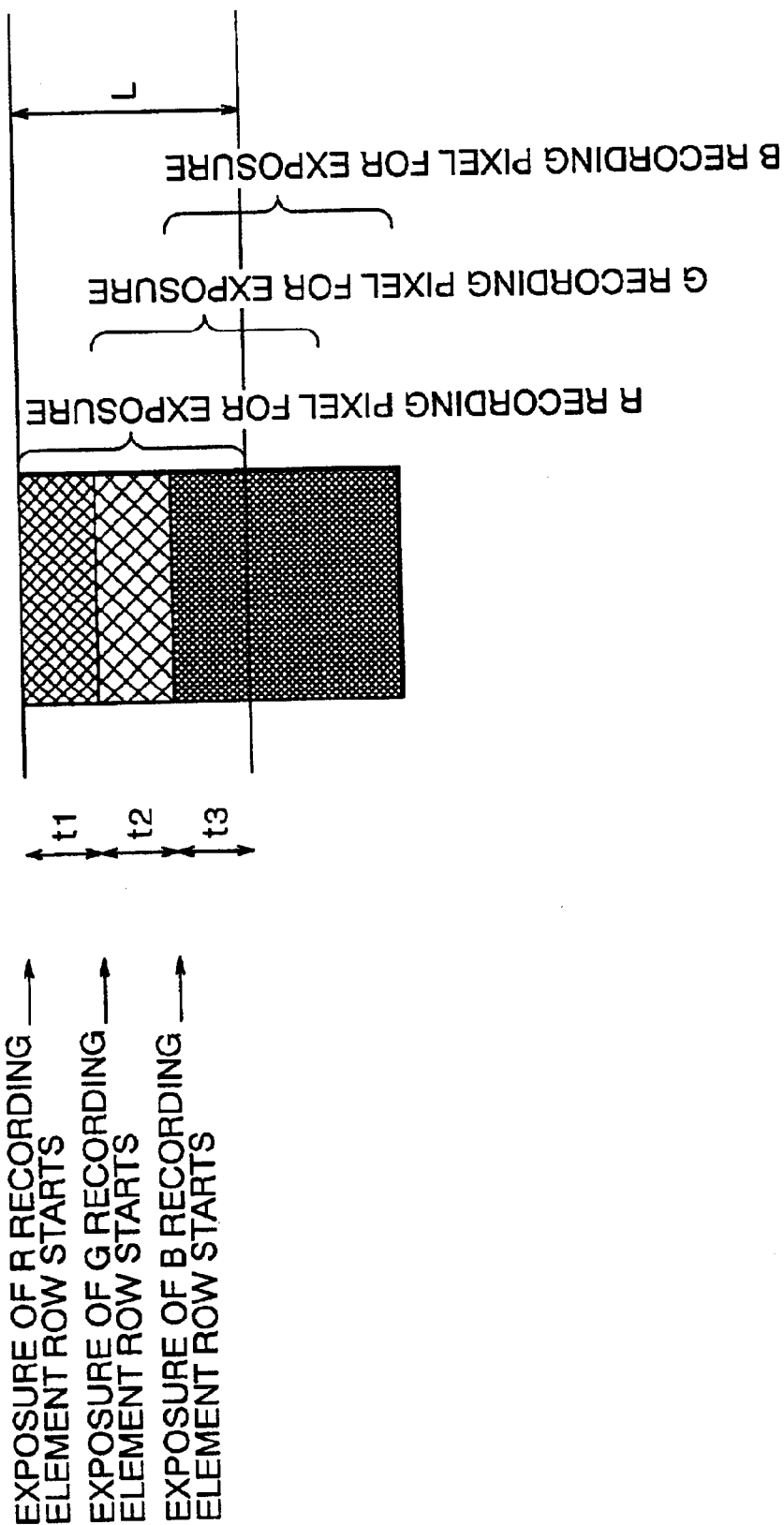
FIG. 4 illustrates sequential exposures resulting in color misalignment.

Such sequential exposures are shown in FIG. 4. Specifically, if exposure times of the R, G, and B recording elements 10 are indicated as t1, t2, and t3, respectively, the exposure of the G recording elements 10 starts substantially t1 after the exposure of the R recording elements 10, and the exposure of the B recording elements 10 starts substantially t2 after the exposure of the G recording elements 10. This causes color misalignment substantially every $\frac{1}{3}$ line.

Accordingly, in order to overcome such color misalignment, the present invention defines the spacing between the recording element rows 9, in view of the exposure timing of the R, G, and B recording element rows 9 such that the G recording element row 9 is substantially $\frac{1}{3}$ line behind the R recording element row 9, and the B recording element row 9 is substantially $\frac{2}{3}$ line behind the R recording element row 9.

Figure 5:
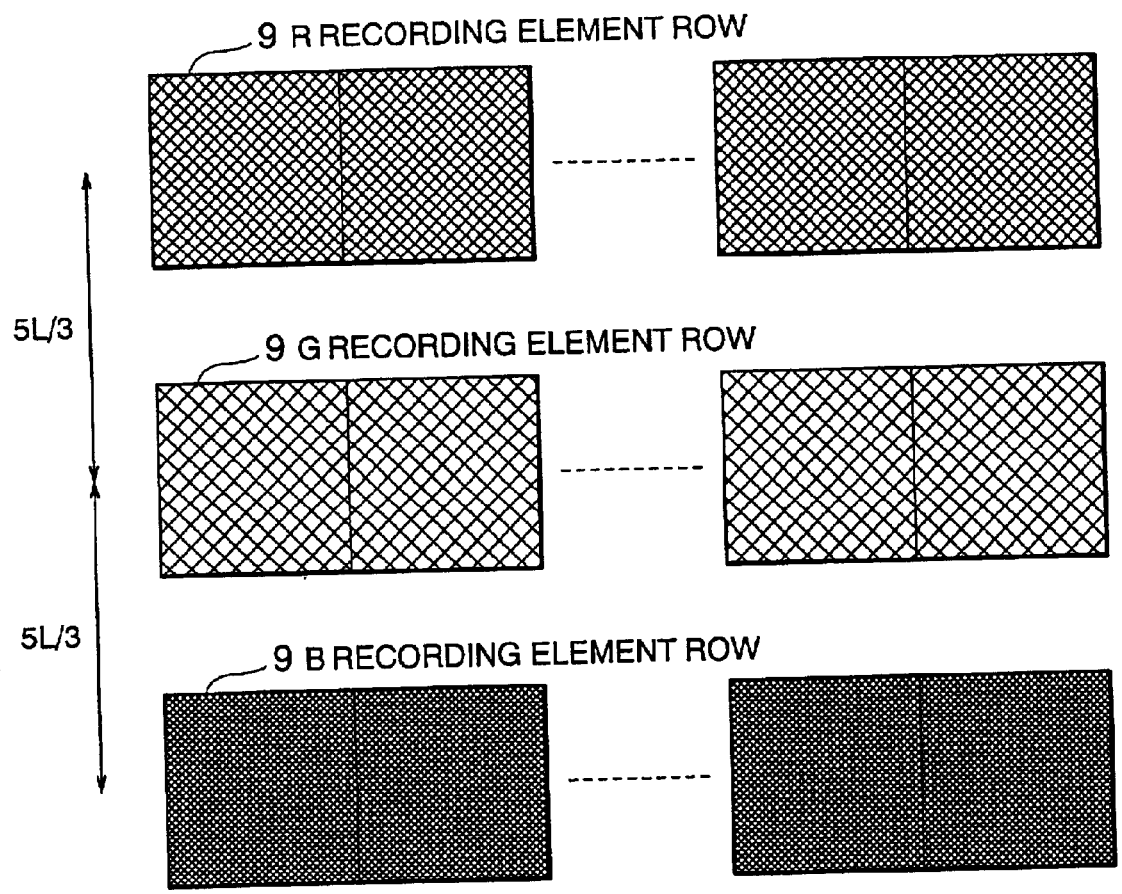
FIG. 5 shows that rows of RGB recording elements are spaced 5L/3 apart, where L denotes the length of one line corresponding to a distance between the center of recording pixels according to the desired resolution for a recorded image.

FIG. 5 shows that the R, G, and B recording element rows 9 are spaced 5L/3 apart, where L denotes the length of one line which corresponds to a distance between the centers of recording pixels according to the desired resolution of the recorded image.

Figure 6:
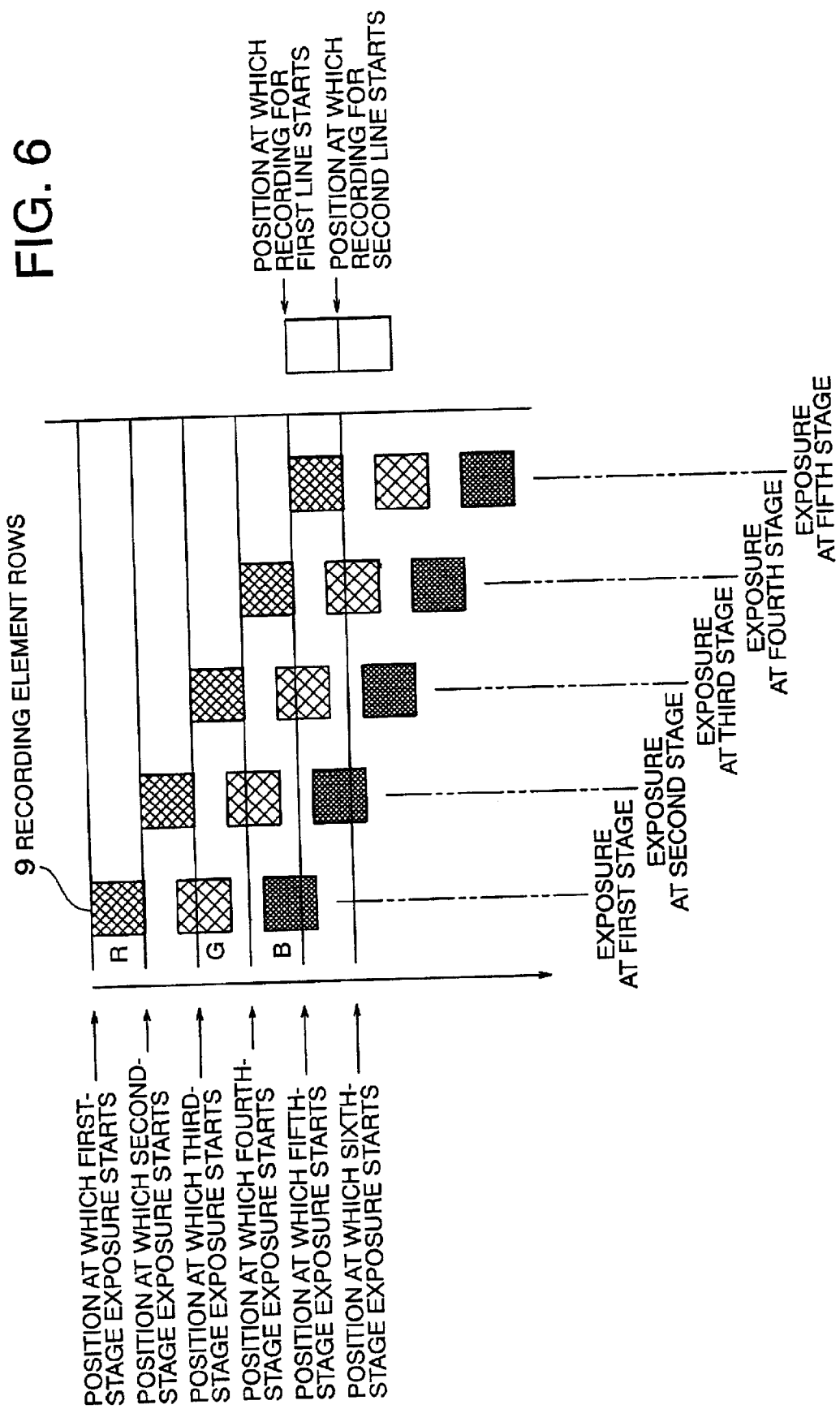
FIG. 6 illustrates an exposure method using the structure shown in FIG. 5.

FIG. 6 illustrates an exposure method using the structure shown in FIG. 5. It will be noted that in FIG. 6, the R, G, and B recording element rows 9 are represented by single recording elements 10, respectively. Furthermore, although in practical use the print head 4 is moved relative to the photosensitive recording medium in the direction indicated by the arrow in FIG. 6, for clarity of illustration, it is shown moving to the right over time. In FIG. 6, considering that the R, G, and B recording element rows 9 are placed with a certain spacing, at a first stage, the R and G recording element rows 9 are in blocking states, while the B recording element row 9 performs a selective exposure to correspond to a first line of the image data.

At a second stage, the R and G recording element rows 9 are in blocking states, while the B recording element row 9 performs a selective exposure to correspond to a second line of the image data. At a third stage, the R recording element row 9 is in a blocking state, while the G and B recording element rows 9 perform selective exposures to correspond to the first line and a third line of the image data, respectively. At a fourth stage, the R recording element row 9 is in a blocking state, while the G and B recording element rows 9 perform selective exposures to correspond to the second line and a fourth line of the image data, respectively. At a fifth stage, the R, G, and B recording element rows 9 perform selective exposures to correspond to the first line, the third line, and a fifth line of the image data, respectively. Thus, the exposure for the first line of the recorded image is completed. At a sixth stage, the R, G, and B recording element rows 9 perform selective exposures to correspond to the second line, the fourth line, and a sixth line of the image data, respectively, to thereby complete the exposure for the second line of the recorded image. The same operation is repeated for the following lines, thereby forming an image of one picture plane.

While the three recording element rows 9 corresponding to R, G, and B colors are shown in FIG. 6, the present invention is not limited thereto. What is required is that the recording element rows 9 are spaced substantially a multiple of L×(m+k/n), as expressed in a general formula, apart, where L denotes the distance between the centers of recording pixels according to the desired resolution of the recorded image, m is an integer more than 0, and k is an integer more than 0 and less than n. For example, the recording element rows 9 can be spaced 8L/3 apart if m=2, k=2, and n=3 are used, or can be spaced 3L/2 apart if m=1, k=1, and n=2 are used. Alternatively, the recording element rows 9 capable of exposure of different colors may be placed at any other spacing according to L×(m+k/n).

In operation, referring to FIG. 1, the image data received as input by the image data input unit 2 is input to the head driver 3. Then, a clock signal, a latch signal, and the like output from the head driver 3 are transferred to the print head 4, to form a grayscale image. It will be noted that the print head 4 incorporates the driver IC 5 for multilevel data, as shown in FIG. 3.

Figure 7:
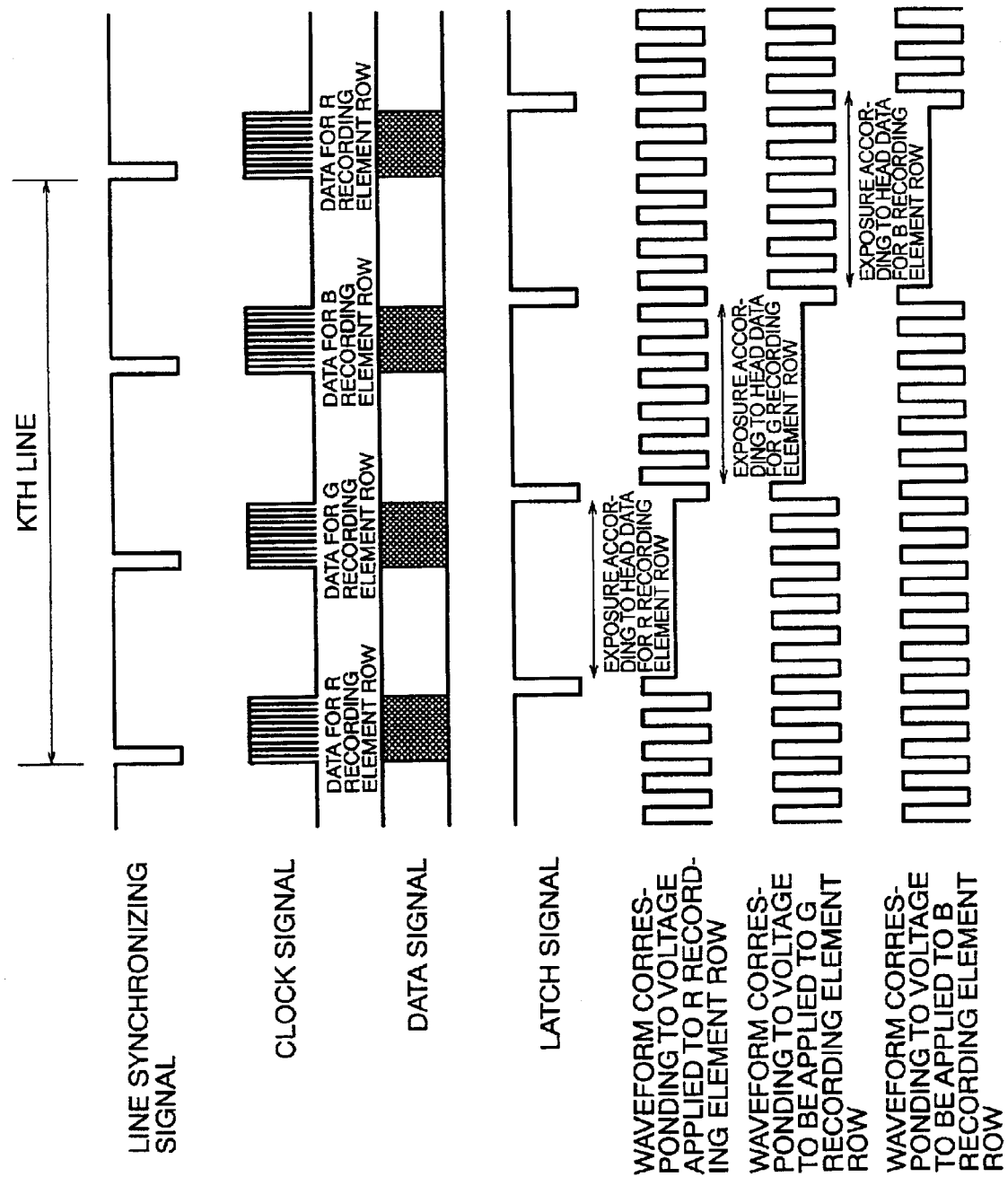
FIG. 7 is a timing chart illustrating how the print head is driven.

FIG. 7 more specifically illustrates how the print head 4 is driven. In FIG. 7, a line synchronizing signal, which is output from the controller 1, indicates a synchronizing signal for each line. For example, when the print head 4 includes three recording element rows 9 corresponding to three colors, three kinds of synchronizing pulses are output.

The pulse intervals of the line synchronizing signal indicate recording periods for the respective colors, and the recording periods depend upon the sensitivity of the photosensitive recording medium, substantially ranging from 0.1 ms to 1 sec. In operation, first, in synchronization with a falling edge of the line synchronizing signal, the head driver 3 outputs a clock signal for the print head 4, and outputs image data as a data signal for the print head 4. Then, the head driver 3 outputs a latch signal after outputting the data signal for one line, while driving the R recording element rows 9 for exposure corresponding to the associated head data. In turn, exposures corresponding to the head data associated with the G and B recording element rows 9 are performed in the same manner, to complete the recording for one line. The same operation is repeatedly performed to form an image in one picture plane.

According to the first embodiment, therefore, the print head 4 having n recording element rows 9 capable of exposure of different colors, where n is an integer more than 1, is designed so that the recording element rows 9 are spaced substantially a multiple of L×(m+k/n) apart, where L denotes a distance between the centers of the recording pixels according to the desired resolution of the recorded image, m is an integer more than 0, and k is an integer more than 0 and less than n. This provides an advantage of high-quality recording.

Figure 8:
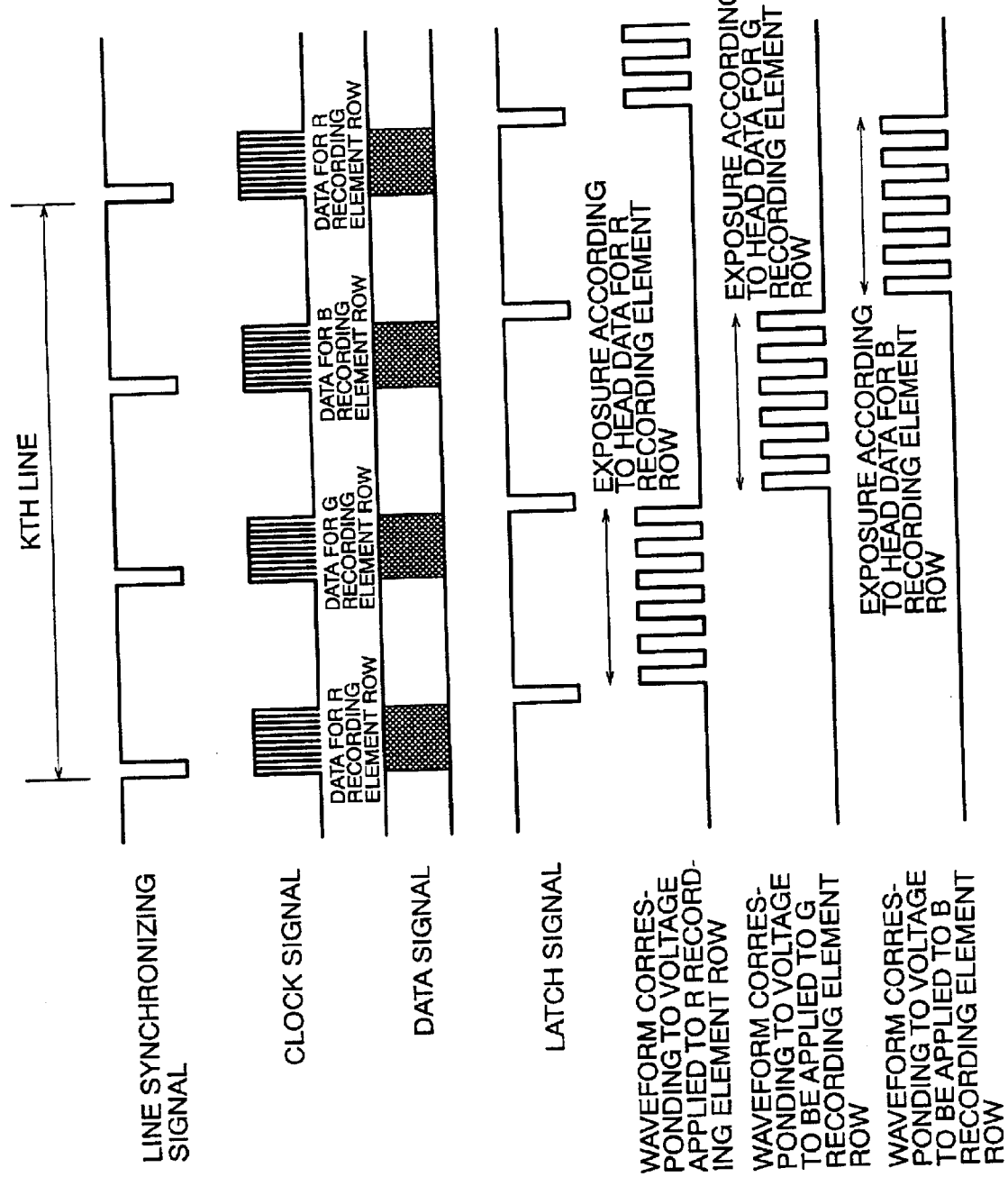
FIG. 8 is a timing chart illustrating an exemplary EL-driving method, in which a voltage is applied only during exposure.

It will be anticipated to a person skilled in the art that the present invention is not limited to the illustrated embodiment, and a variety of modifications and combinations may be made without departing from the spirit and scope of the invention. For example, the print head 4 may be electroluminescent (EL). The EL print head 4 includes a substrate on which a metal electrode, an insulating layer, a luminescent layer, an insulating layer, and a transparent electrode are layered in the stated order, and a separate exposure unit corresponding to recording pixels, such that a voltage exceeding a threshold luminescence value is applied to the metal electrode and the transparent electrode for selective light emission. FIG. 8 illustrates an EL-driving method example, in which a voltage is applied only during exposure. Furthermore, image data storage for storing a predetermined amount, such as one line or one picture plane, of image data may be provided to reduce the time required for data transfer to an external host computer. An image processor may also be provided before the head driver 3, serving as the image data input unit 2.

Moreover, binary data rather than multilevel data may be transferred to the print head 4. Still further, the latch 7 may be omitted in the driver IC 5 to reduce cost.

Second Embodiment

Figure 9:
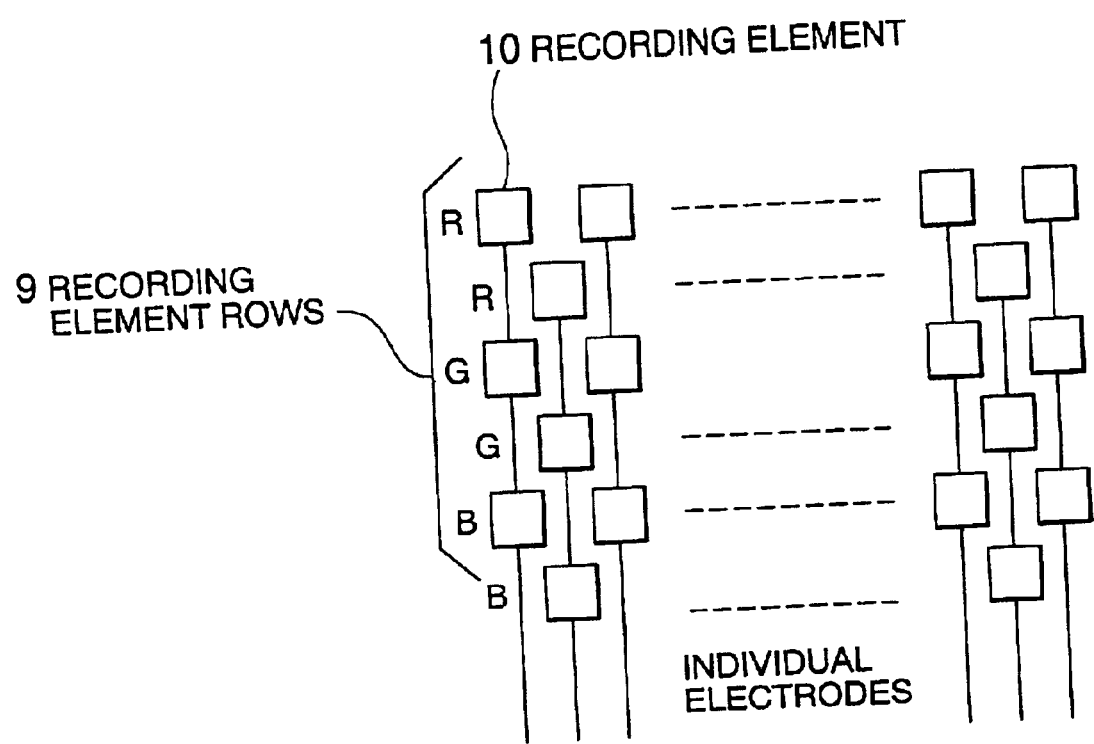
FIG. 9 is a schematic view showing a print head according to a second embodiment of the present invention, in which recording elements are staggered.

An optical printing device according to a second embodiment of the present invention is described with reference to FIGS. 9 and 10, which show a modification of the print head according to the first embodiment. In the second embodiment, the recording elements 10 in the print head 4 are aligned in a staggered manner instead of a linear array. Referring to FIG. 9, odd recording elements 10 and even recording elements 10 in the recording element rows 9 shown in FIG. 2 are aligned in a staggered manner. This staggered alignment is intended to provide improvements over the linear array of recording elements 10. Namely, when the recording elements 10 are aligned in a linear array, black or white stripes are likely to occur on a recorded image because gaps occur between the recording elements 10 due to the arrangement of electrodes.

Prior to the operation, an exposure method according to the second embodiment is described with reference to FIG. 10.

Figure 10:
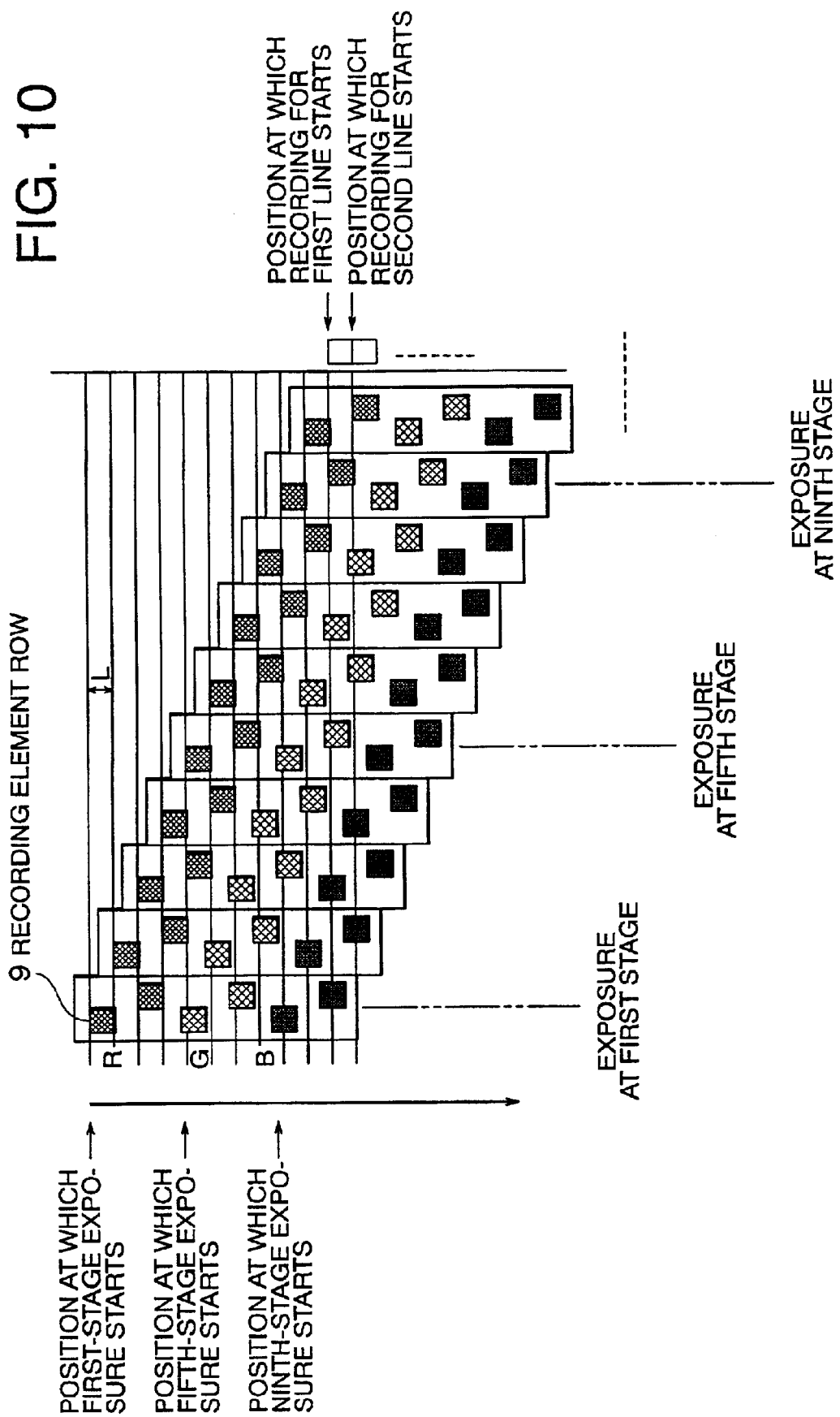
FIG. 10 illustrates an exposure method according to the second embodiment.

FIG. 10 shows that the R, G, and B recording element rows 9 are spaced 11L/3 apart, the pitch between the staggered recording elements 10 being 2L, where L is the length of one line. For the sake of convenience, odd and even recording elements 10 which are staggered in each recording element row are numbered 1 and 2, respectively, and each of the R, G, and B recording element rows 9 is represented by two recording elements 10, namely, first and second recording elements 10. Although in practical use the print head 4 is moved relative to the photosensitive recording medium in the direction indicated by the arrow in FIG. 10, for clarity of illustration, it is shown moving to the right over time.

Considering that the R, G, and B recording element rows 9 are placed with a certain spacing and the recording elements 10 are staggered, at a first stage, the R and G recording element rows 9, and the first recording element 10 in the B recording element row 9 are not selected for exposure, while the second recording element 10 in the B recording element row 9 performs selective exposure to correspond to a first line of the image data.

At a second stage, the R and G recording element rows 9, and the first recording element 10 in the B recording element row 9 are not selected for exposure, while the second recording element 10 in the B recording element row 9 performs selective exposure to correspond to a second line of the image data.

At a third stage, the R and G recording element rows 9 are not selected for exposure, while the first and second recording elements 10 in the B recording element row 9 perform selective exposures to correspond to the first line and a third line of the image data, respectively. At a fourth stage, the R and G recording element rows 9 are not selected for exposure, while the first and second recording elements 10 in the B recording element row 9 perform selective exposures to correspond to the second line and a fourth line of the image data, respectively.

At a fifth stage, the R recording element row 9 and the first recording element 10 in the G recording element row 9 are not selected for exposure, while the second recording element 10 in the G recording element row 9 performs a selective exposure according to the first line of the image data. Further, the first and second recording elements 10 in the B recording element row 9 perform selective exposures to correspond to the third line and a fifth line of the image data, respectively. The same operation is repeated for the following lines, thereby forming the first line of the recorded image after the eleventh stage. The same operation is further repeated to form one picture plane of the image.

Similarly to the first embodiment, importantly, the pitch between the staggered recording elements 10 may be substantially a multiple of L, where L denotes a distance between the centers of the recording pixels according to the desired resolution of the recorded image. Furthermore, the recording element rows 9 may be spaced substantially a multiple of L*(m+k/n) apart, where m is an integer more than 0, and k is an integer more than 0 and less than n.

The operation of the optical printing device according to the second embodiment is the same as that of the first embodiment, except for the alignment of the recording elements 10. Referring to FIGS. 1, 9 and 10, the image data received as input by the image data input unit 2 is input to the head driver 3. Then, a clock signal, a latch signal, and the like output from the head driver 3 are transferred to the print head 4, to form a grayscale image according to the above-described exposure method.

Accordingly, the recording elements 10 in the print head 4 are not aligned in a linear array but in a staggered manner, and this provides an advantage of high-quality recording without black or white stripes.

It will be anticipated again to a person skilled in the art that a variety of modifications or combinations may be made in the second embodiment, as described in the first embodiment. For example, the order of alignment of the R, G, and B recording element rows may be changed to B, G, and R, or G, B, and R recording element rows.

Third Embodiment

An optical printing device according to a third embodiment of the present invention is described. The optical printing device is advantageous when three recording element rows 9 corresponding to R, G, and B colors are employed, and when the resulting colors after the exposures are successively performed in one line to form an image. In other words, according to the third embodiment, by changing over a plurality of exposures of the recording element rows 9 in one line, and by making use of the integrating capability of the human eye, color misalignment caused by sequential exposures, as shown in FIG. 4, is eliminated or reduced.

Figure 11:
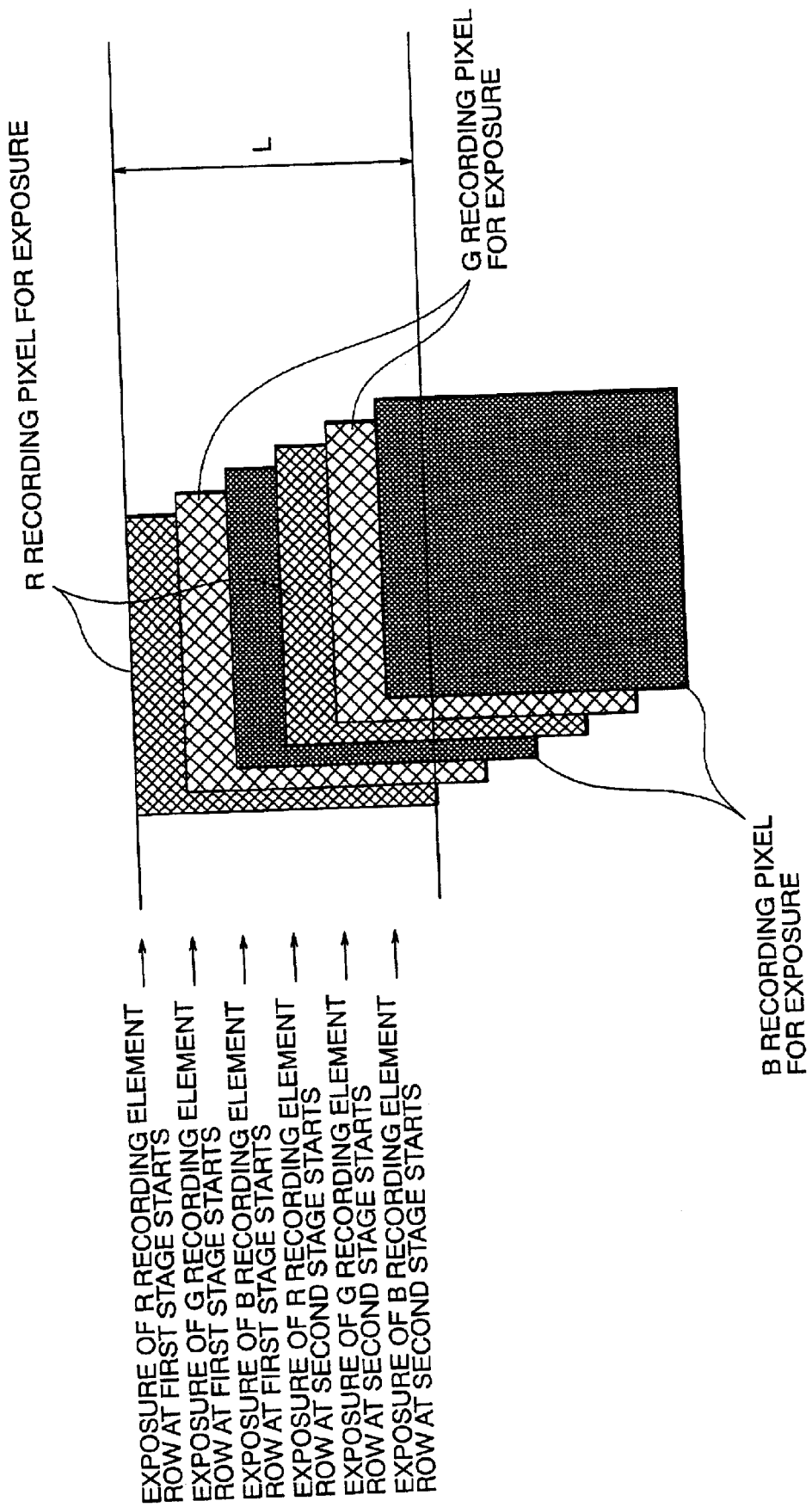
FIG. 11 illustrates that six exposures of the rows of recording elements are successively performed in one line according to a third embodiment of the present invention.

FIG. 11 illustrates that six exposures of the recording element rows 9 are successively performed in one line, which allows the amount of color misalignment for each color to be reduced by half. For clarity of illustration, the recording pixels are displaced to the right.

The number of exposures of the recording element rows 9 is only required to be more than the number of resulting colors after the exposure, and the order in which the exposures are successively performed is not limited in particular. For example, in the case where the recording element rows 9 are RGB recording element rows which use the integrating capability of the human eye or the sensitivity to the output visible light for each color, five exposures of the R, G, B, G, and B recording element rows 9 may be successively performed. Alternatively, in the case where the recording element rows 9 are of the type which outputs ultraviolet rays, ultraviolet ray 1, ultraviolet ray 2, and ultraviolet ray 1 may be emitted, the ultraviolet rays 1 and 2 having different wavelengths. While exposure times for the respective colors are substantially the same in FIG. 11, alternatively the exposure times may be different.

Figure 12:
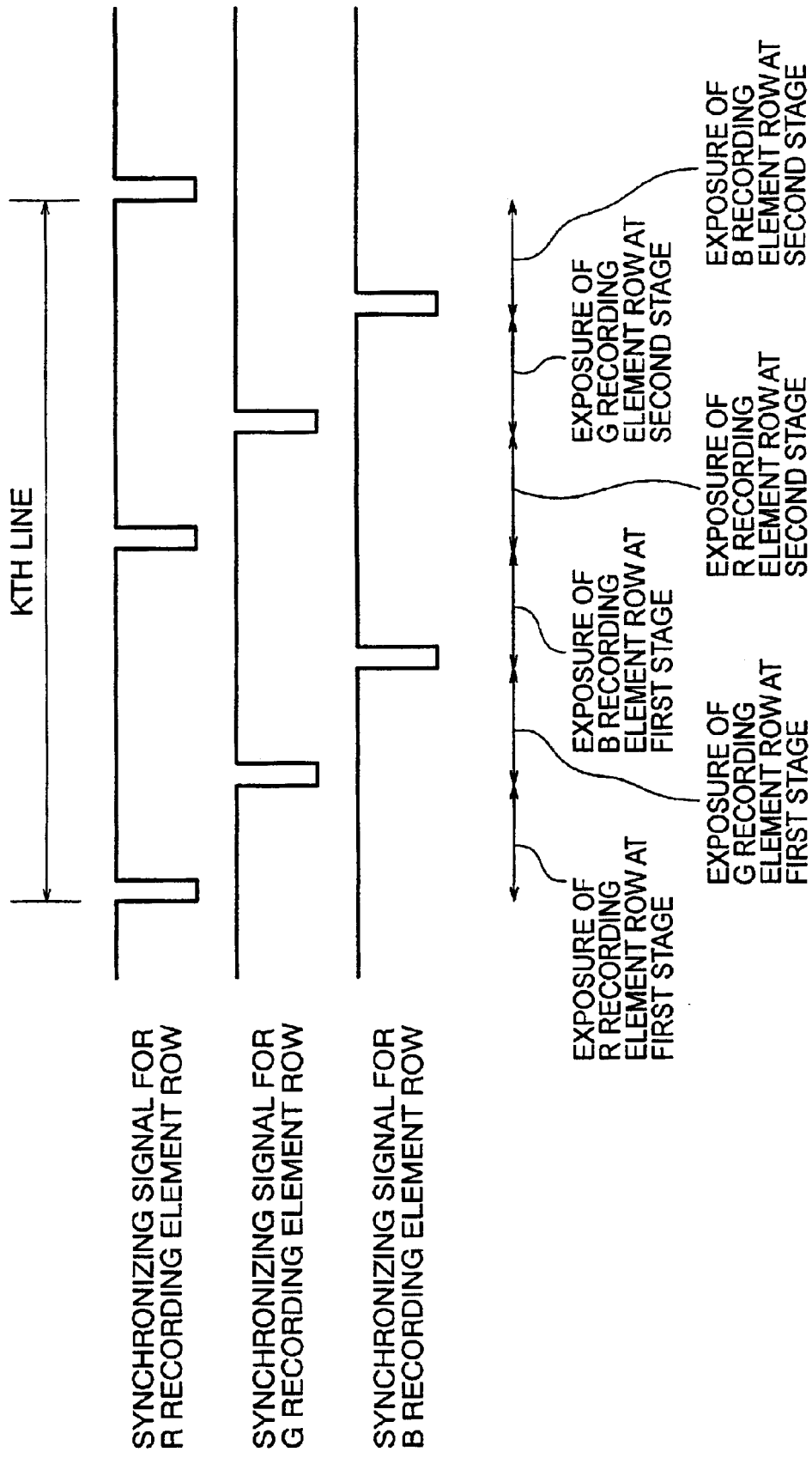
FIG. 12 is a timing chart showing how the print head according to the third embodiment is driven.

In describing the operation, reference is made to FIGS. 1 and 12. FIG. 12 illustrates how the print head 4 is driven according to the third embodiment, in which R, G, and B synchronizing signals are used instead of the line synchronizing signal shown in FIGS. 7 and 8. Specifically, in synchronization with a falling edge of the R synchronizing signal output from the controller 1, a head data signal, a latch signal, and the like are output according to the image data as described above, so that a first exposure of the R recording element row 9 is completed. Then, through the same procedure, in synchronization with a falling edge of the G synchronizing signal, a first exposure of the G recording element row 9 is completed, and in synchronization with a falling edge of the B synchronizing signal, a first exposure of the B recording element row 9 is completed. Following these first exposures, in synchronization with falling edges of the R, G, and B synchronizing signals, second exposures of the R, G, and B recording element rows 9 are performed in the same manner, thus forming one line of an image. The same operation is repeatedly performed to form one picture plane of an image.

Accordingly, since a plurality of exposures, i.e., the number of resulting colors after the exposure plus 1 or more exposures, of the recording element rows 9 are successively performed in one line, high-quality recording with less color misalignment will be achieved.

Again, a variety of modifications may be made in the third embodiment as described in the first embodiment. The spacing between the recording element rows 9 is not limited in particular, and may be, for example, substantially a multiple of L.

When a plurality of exposures are desirable for each color, a first exposure may be performed for first to 127th grayscale level data, and a second exposure may be performed for the remaining grayscale level data. Alternatively, a first exposure may be performed for odd grayscale level data, and a second exposure may be performed for even grayscale level data. This can be adapted simply by modifying the head driver 3 because this is relevant to the design of the head driver 3. Furthermore, the first exposure time may be different from the second exposure time, or the exposure may be performed in combination with relative movement between the print head 4 and the photosensitive recording medium. Various modifications may be made.

The line synchronizing signals shown in FIGS. 7 and 8 may also be used. In this case, exposures of the R recording element row 9 may start at the first and fourth pulses, exposures of the G recording element row 9 may start at the second and fifth pulses, and exposures of the B recording element row 9 may start at the third and sixth pulses.

Fourth Embodiment

Figure 13:
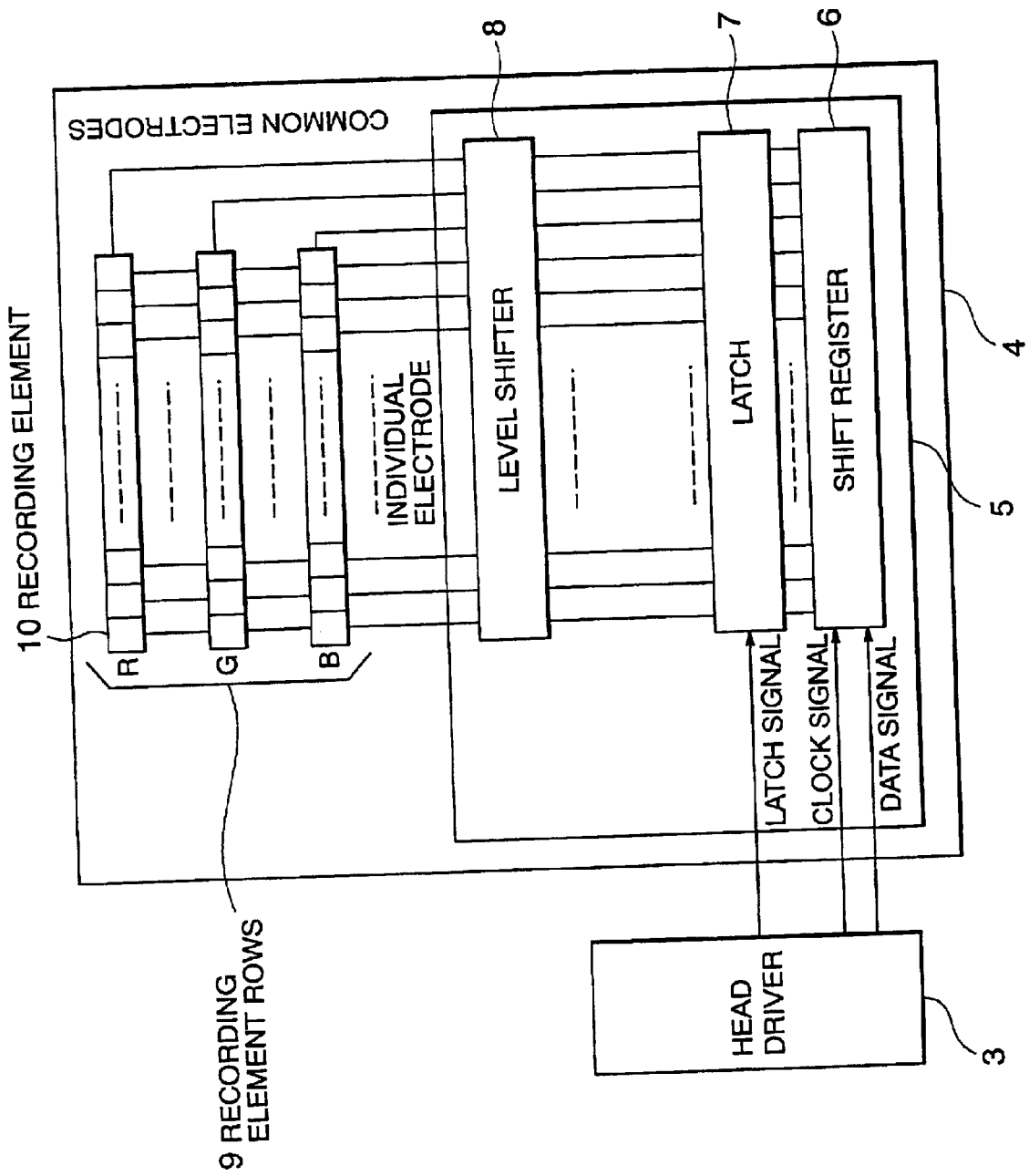
FIG. 13 is a schematic view showing in detail a print head according to a fourth embodiment of the present invention.

An optical printing device according to a fourth embodiment of the present invention is described with reference to FIG. 13, which shows a modification of the print head according to the first embodiment. In the fourth embodiment, the individual electrode signals and the common electrode signals are output from a common driver IC. FIG. 13 corresponds to FIG. 2, except that the common electrode signals from the head driver 3 are output from the driver IC 5. This is based on the fact that the electric field applied/removed between the individual electrodes and the common electrodes controls light to be transmitted through or blocked by the recording elements 10. Specifically, in the case of the common electrode data "1", light is transmitted when the head data signal as binary data is "1", because the common electrode data equals the individual electrode data whereby the electric field is removed. On the other hand, when the head data signal is "0", light is blocked because the common electrode data differs from the individual electrode data, whereby the electric field is applied.

The operation of components other than the head driver 3 is the same as that in the first embodiment, and therefore a description thereof is omitted. Referring to FIGS. 1 and 13, initially, the head driver 3 outputs the common electrode and individual electrode data signals to the print head 4 in synchronization with a clock signal. More specifically, the common electrode data "1" for the R recording element row, the common electrode data "0" for the G recording element row, and the common electrode data "0" for the B recording element row are added to normal image data. Based on the individual electrode and common electrode data signals, which are latched by the latch signals and are then output from the level shifter 8, only the R recording element row 9 performs selective exposure. For the exposure of the G or B recording element row 9, the only requirement is that "1" is supplied as the common electrode data for the G or B recording element row.

Accordingly, the individual electrode and common electrode data signals are output from the same drive IC 5, and this provides an advantage of high-quality recording at low cost.

Again, a variety of modifications and combinations may be made in the fourth embodiment as described in the first to third embodiments. For example, the print head 4 for multilevel data has the same advantages. Moreover, the present invention may also be implemented in EL displays or negative liquid crystal displays, in which the only requirement is to determine the common electrode data so that an electric field is applied.

Fifth Embodiment

Figure 14:
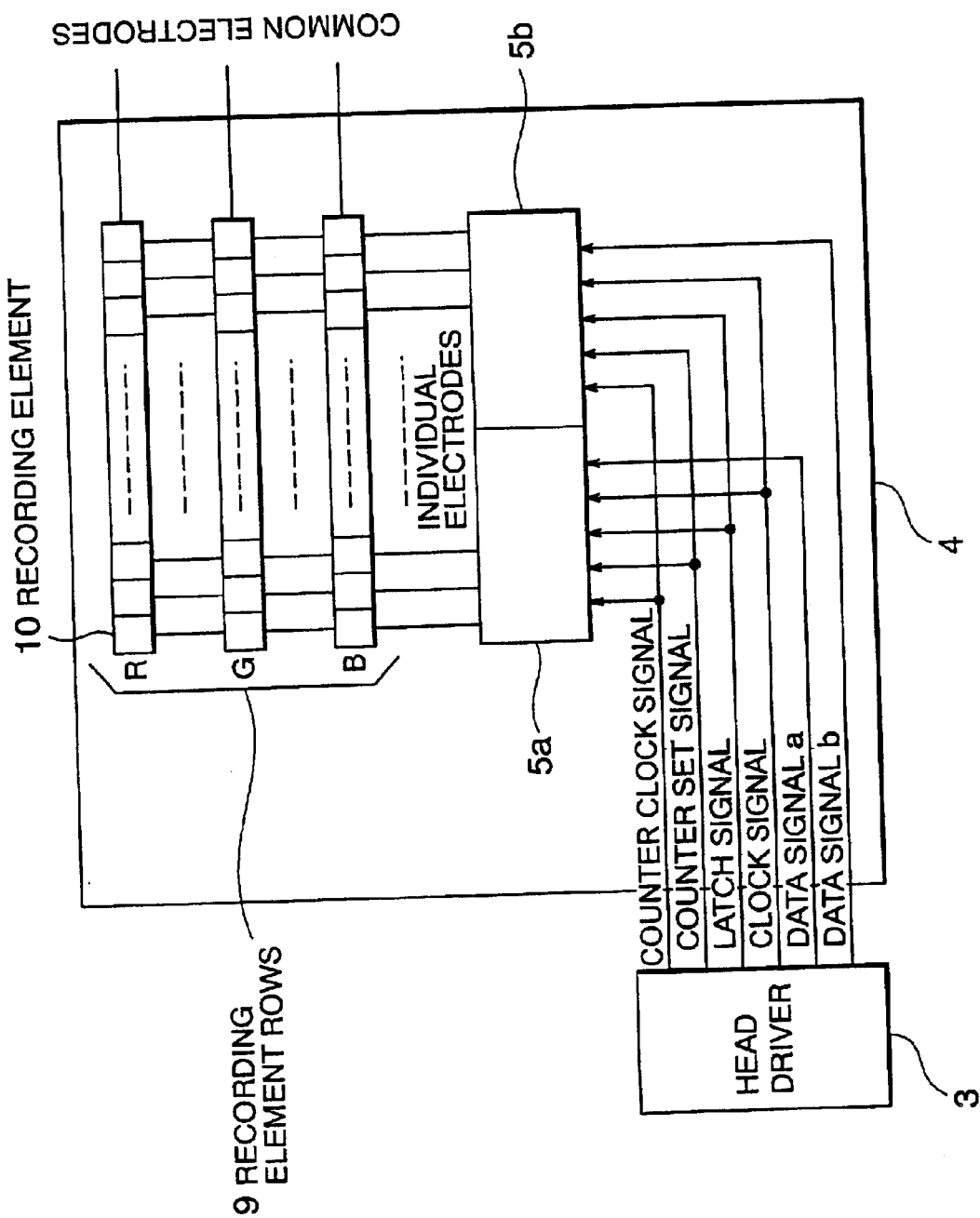
FIG. 14 is a schematic view showing in detail a print head according to a fifth embodiment of the present invention.
Figure 15:
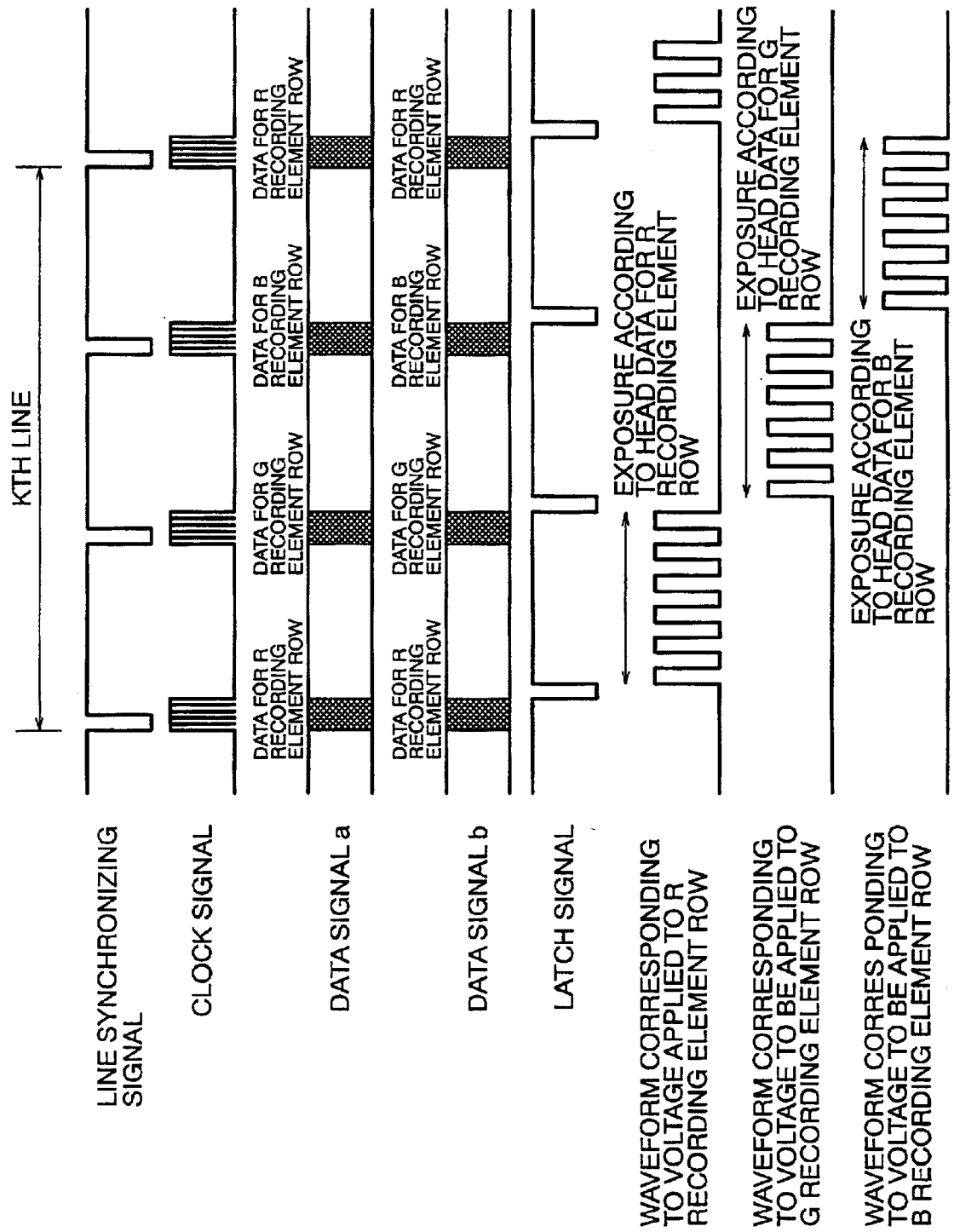
FIG. 15 is a timing chart showing how the print head according to the fifth embodiment is driven.
Figure 16:
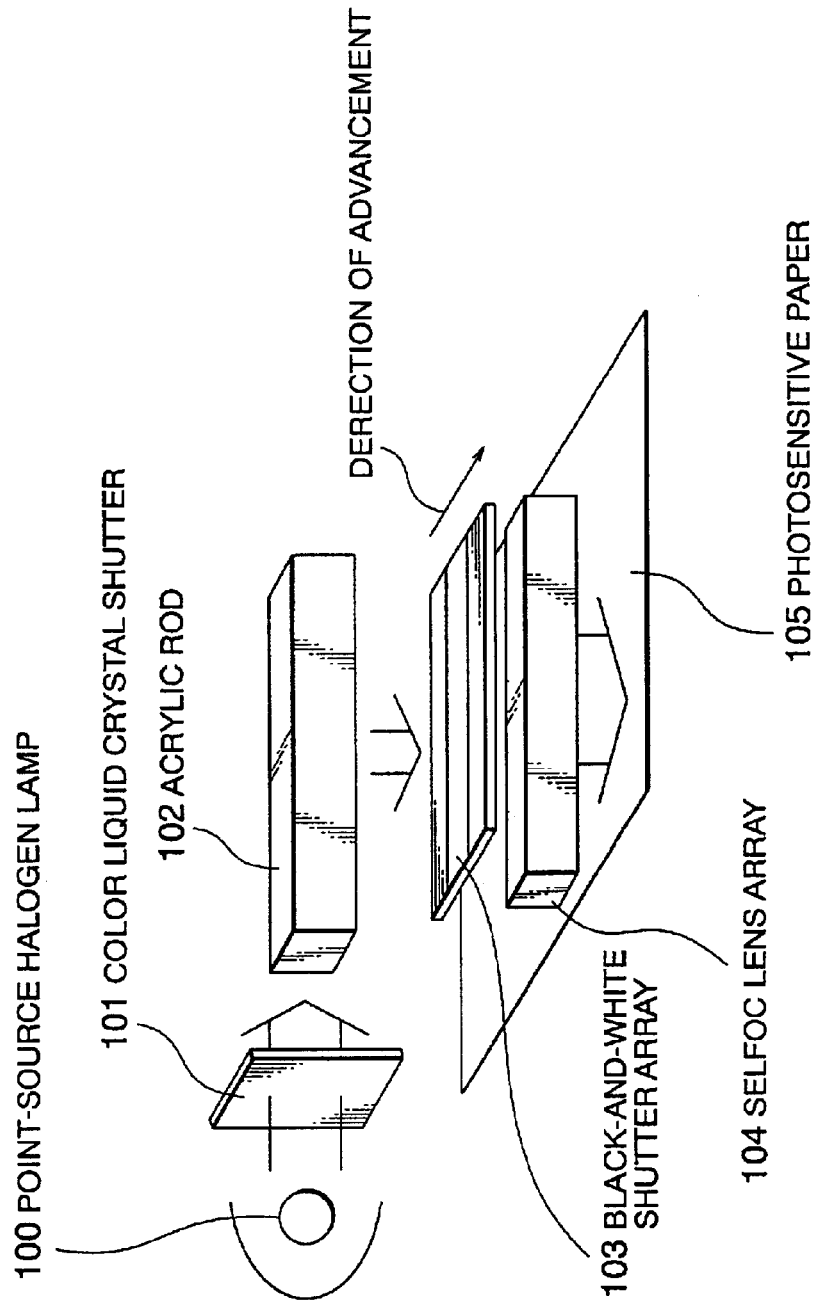
FIG. 16 is a perspective view schematically showing a conventional optical print head.

An optical printing device according to a fifth embodiment is described with reference to FIGS. 14 and 15, which show a modification of the print head according to the first embodiment. In the fifth embodiment, different driver ICs 5 are mounted on the print head 4, to which at least head data signals output from the head driver 3 are supplied. This is advantageous when the time required for data transfer to the print head 4 is longer than the exposure time. A plurality of driver ICs 5 are provided so that at least head data signals output from the head driver 3 are independently connected to the driver ICs 5. Referring to FIG. 14, in place of the driver IC 5 shown in FIG. 3, driver ICs 5a and 5b are aligned so as to correspond to the left and right sides, respectively, of the recording element rows 9.

The operation of components other than the head driver 3 is the same as that in the first embodiment, and therefore a description thereof is omitted. It will be noted that FIG. 15 corresponds to FIG. 8.

In synchronization with a clock signal, initially, a data signal "a" at the left of the recording element rows 9 and a data signal "b" at the right of the recording element rows 9 are output from the head driver 3 substantially at the same time. The data signals "a" and "b" are then latched with a latch signal, as described in the first embodiment, for selective exposure.

Accordingly, different data signals "a" and "b" output from the head driver 3 are supplied to the driver ICs 5a and 5b, and this provides the advantages of high-speed and high-quality recording.

Again, a variety of modifications and combinations may be made in the fifth embodiment, as described in the first to fourth embodiments. For example, two driver ICs 5a and 5b are used in the fifth embodiment, but the present invention is not limited thereto, and any number more than one of driver ICs may be used. Furthermore, clock signals or data signals may not be synchronized with line synchronizing signals but may be synchronized with rising edges of the latch signals. Otherwise, the frequency of the clock signal may be decreased so that the time required for data transfer may substantially correspond to the exposure time, to further reduce cost.

What is claimed is:

1. An optical printing device for exposing a photosensitive recording medium to form a grayscale image, comprising:

a print head having n rows of recording elements capable of exposure of different colors and aligned in a direction of advancement of the photosensitive recording medium, where n is an integer more than 1, the n rows of recording elements being spaced substantially a multiple of $L \times (m+k/n)$ apart in the direction of advancement of the photosensitive recording medium, where L denotes a distance between the centers of recording pixels according to the desired resolution of a recorded image, m is an integer of 1 or more, and k is an integer of 1 or more and less than n; and a head driver for driving said print head, wherein light from said print head is selectively exposed on the photosensitive recording medium to form the grayscale image.

2. An optical printing device according to claim 1, wherein the recording elements in the n rows of recording elements capable of exposure of different colors are staggered.

3. An optical printing device according to claim 1, wherein said print head includes at least one driver IC, the driver IC outputting individual electrode and common electrode signals for driving the recording elements in the n rows of recording elements.

4. An optical printing device according to claim 1, wherein said print head includes:

counter means for counting one of a counter clock signal and a latch signal, the counter clock signal and the latch signal being output from said head driver; and head data comparator means for comparing the output of said counter means with latched head data.

5. An optical printing device according to claim 1, wherein said print head further includes a single individual electrode for driving the recording elements in the n rows of recording elements, the individual electrode being shared by a plurality of the recording elements.

6. An optical printing device according to claim 1, wherein each of different head data signals output from said head driver is supplied to the driver IC on said print head.

7. An optical printing device according to claim 1, wherein said print head has a positive twisted nematic liquid crystal.

8. An optical printing device according to claim 1, wherein said print head has an electroluminescent exposing unit.

9. An optical printing device for exposing a photosensitive recording medium to form a grayscale image, comprising:

a print head having n rows of recording elements capable of exposure of different colors and aligned in a direction of advancement of the photosensitive recording medium, where n is an integer more than 1; and a head driver for driving said print head to successively perform the exposure of the n rows of recording elements so as to provide n+1 colors after the exposure in one line, wherein light from said print head is selectively exposed on the photosensitive recording medium to form the grayscale image.

* * * * *